US012145163B2

(12) United States Patent
Chen

(10) Patent No.: US 12,145,163 B2
(45) Date of Patent: Nov. 19, 2024

(54) ADJUSTABLE GARDEN SPRINKLER

(71) Applicant: SHIN TAI SPURT WATER OF THE GARDEN TOOLS CO., LTD, Lukang Township, Changhua County (TW)

(72) Inventor: Chin-Yuan Chen, Lukang Township, Changhua County (TW)

(73) Assignee: SHIN TAI SPURT WATER OF THE GARDEN TOOLS CO., LTD., Changhua County (TW)

( * ) Notice: Subject to any disclaimer, the term of this patent is extended or adjusted under 35 U.S.C. 154(b) by 365 days.

(21) Appl. No.: 17/687,666

(22) Filed: Mar. 6, 2022

(65) Prior Publication Data

US 2023/0278063 A1 Sep. 7, 2023

(51) Int. Cl.
*B05B 15/652* (2018.01)
*B05B 1/20* (2006.01)
*B05B 15/625* (2018.01)
*B05B 15/65* (2018.01)

(52) U.S. Cl.
CPC .............. *B05B 15/652* (2018.02); *B05B 1/20* (2013.01); *B05B 15/625* (2018.02)

(58) Field of Classification Search
CPC ..... B05B 15/652; B05B 15/625; B05B 15/65; B05B 1/20; B05B 1/14; B05B 3/06; B05B 3/02; B05B 3/025; B05B 3/027
See application file for complete search history.

(56) References Cited

U.S. PATENT DOCUMENTS

| | | | | | |
|---|---|---|---|---|---|
| 4,905,903 | A * | 3/1990 | Katzer | B05B 3/06 | 239/246 |
| 5,680,990 | A * | 10/1997 | Wang | B05B 15/654 | 239/258 |
| 7,252,246 | B2 * | 8/2007 | Heren | B05B 3/044 | 239/548 |
| 8,534,573 | B2 * | 9/2013 | Wang | B05B 3/044 | 239/602 |
| 9,597,699 | B2 * | 3/2017 | Helmsderfer | B05B 1/1654 | |
| D868,207 | S * | 11/2019 | Hsieh | D23/214 | |
| 2009/0308950 | A1 * | 12/2009 | Lo | B05B 3/044 | 239/242 |
| 2012/0104118 | A1 * | 5/2012 | Wang | B05B 1/083 | 239/380 |
| 2014/0283448 | A1 * | 9/2014 | Harris | A01G 9/02 | 29/891 |

(Continued)

*Primary Examiner* — George Chen
*Assistant Examiner* — Jialan Zhang

(57) ABSTRACT

An adjustable garden sprinkler has a base member and a plurality of irrigators. The base member has a first main body and a second main body, a plurality of connecting pipes protruding from the second main body, and a plurality of connecting pipes are provided on one side of the periphery of the connecting pipes. Each irrigator has a first housing and a second housing that opposite to each other, and a control member is provided between the first and the second housings. The control member is provided with a plurality of first through aperture, a plurality of second through aperture and a plurality of third through aperture, one end of the control member is provided with an outer threaded pipe extending out of the first housing and the second housing, a screwing cap is attached on the outer threaded pipe, and a spraying unit installed inside the first housing.

12 Claims, 8 Drawing Sheets

(56) References Cited

U.S. PATENT DOCUMENTS

| | | | | |
|---|---|---|---|---|
| 2016/0016187 | A1* | 1/2016 | Scantling | B05B 7/2443 137/888 |
| 2020/0230627 | A1* | 7/2020 | Chen | B05B 15/652 |
| 2021/0114046 | A1* | 4/2021 | Chen | B05B 3/021 |
| 2022/0193702 | A1* | 6/2022 | Liu | A63G 31/007 |

* cited by examiner

A-A

B-B

ADJUSTABLE GARDEN SPRINKLER

BACKGROUND of INVENTION

Field of Invention

The present invention relates to an adjustable garden sprinkler, and more particularly to a garden sprinkler with adjustable watering angle and watering direction.

Description of the Related Art

Commonly, sprinklers are used to sprinkle water on the grass or plant garden, and the current known sprinklers all have the base members placed on the ground. The base member has a standpipe, one end of the standpipe is used to connect the water source water pipe, and the other end is extended with several sprinkler rods. Using the conduction between the sprinkler rod and the standpipe, the water source can be sprayed from the sprinkler rod, so as to obtain the sprinkler within a certain effective range.

However, the above conventional structure still has the following problems in practical application: the spraying angle of the sprinkler rod is fixed and cannot be adjusted, so that the sprinkler can only spray a small area; also when the garden range is larger, multiple sprinklers need to be used at the same time, or the sprinklers are frequently moved, which is quite inconvenient to use.

Therefore, it is desirable to provide an adjustable garden sprinkler to mitigate and/or obviate the aforementioned problems.

SUMMARY OF THE INVENTION

An objective of present invention is to provide an adjustable garden sprinkler.

To achieve these and other objects of the present invention, an adjustable garden sprinkler has a base member and a plurality of irrigators. The base member has a first main body and a second main body, a plurality of connecting pipes protruding from the second main body, and a plurality of connecting pipes are provided on one side of the periphery of the connecting pipes. Each irrigator has a first housing and a second housing that opposite to each other, and a control member is provided between the first and the second housings. The control member is provided with a plurality of first through aperture, a plurality of second through aperture and a plurality of third through aperture, one end of the control member is provided with an outer threaded pipe extending out of the first housing and the second housing, a screwing cap is attached on the outer threaded pipe, and a spraying unit installed inside the first housing.

Other objects, advantages, and novel features of invention will become more apparent from the following detailed description when taken in conjunction with the accompanying drawings.

DETAILED DESCRIPTION OF THE PREFERRED EMBODIMENT

Figure 1:
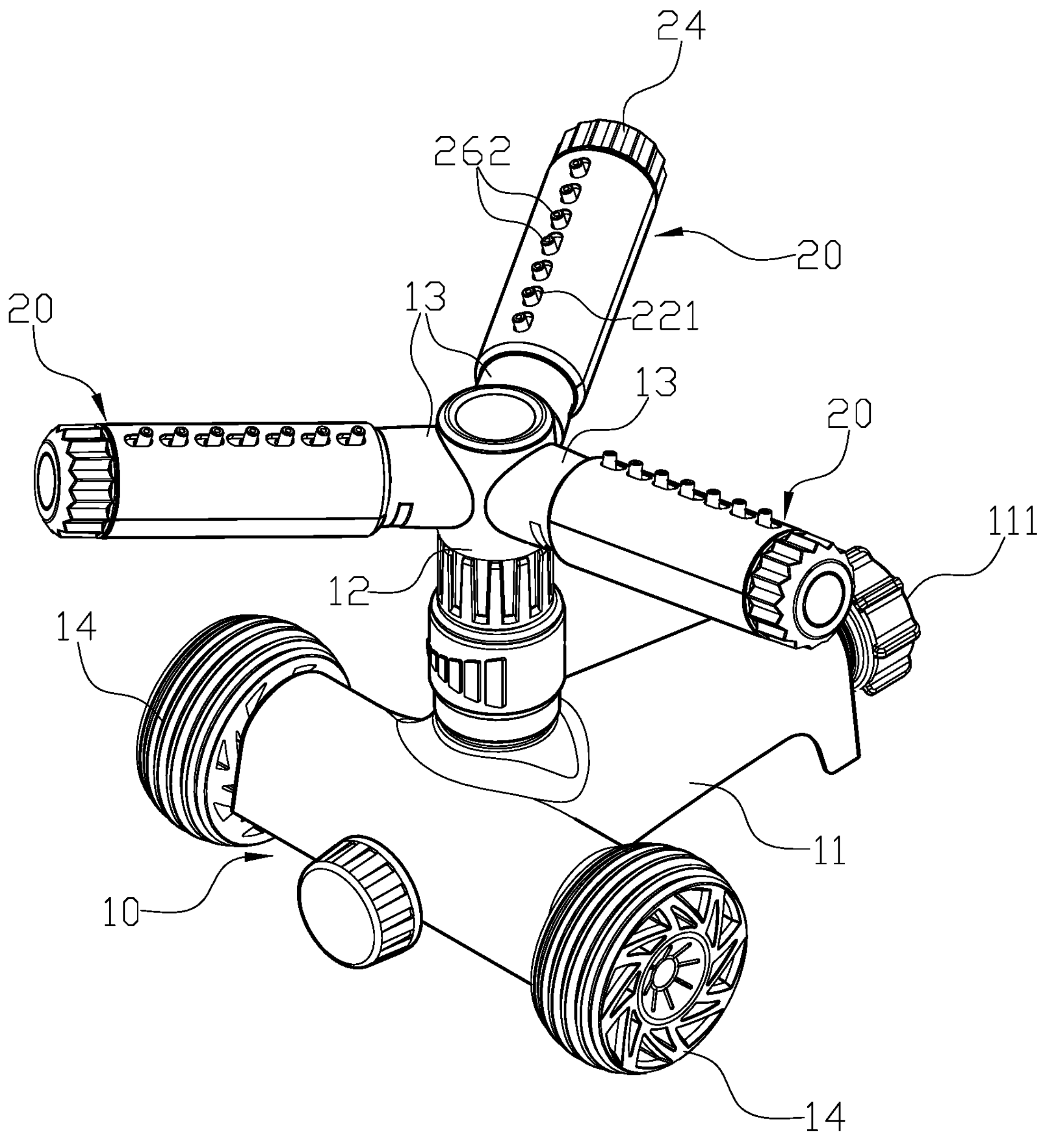
FIG. 1 is a three-dimensional combined drawing of a preferred embodiment according to the present invention.
Figure 2:
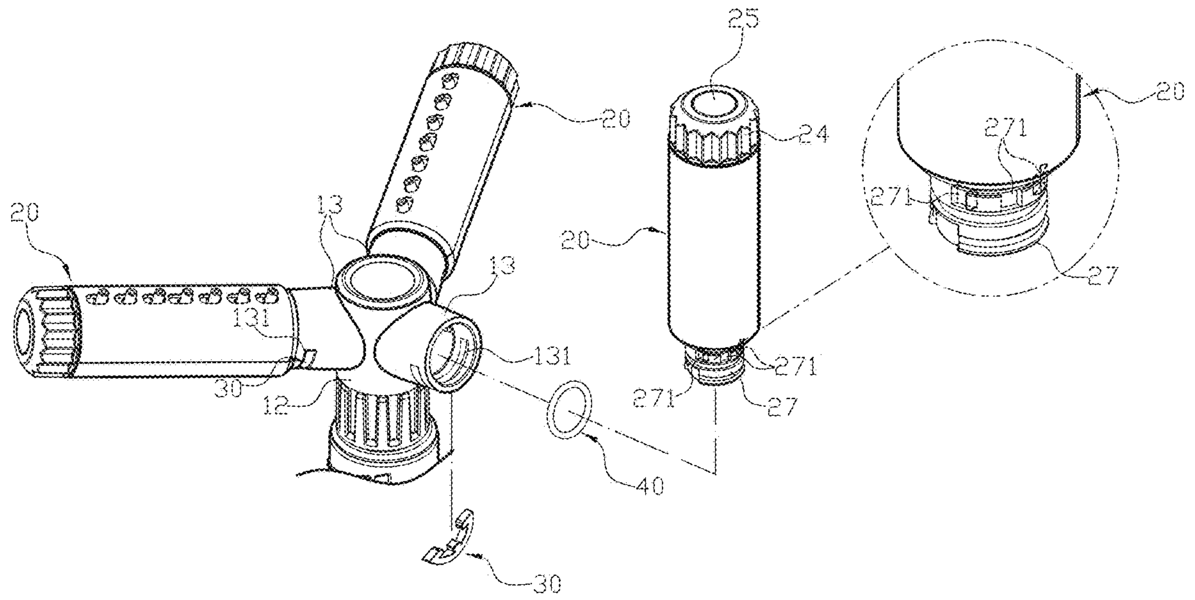
FIG. 2 is a three-dimensional exploded view of the preferred embodiment according to the present invention.
Figure 3:
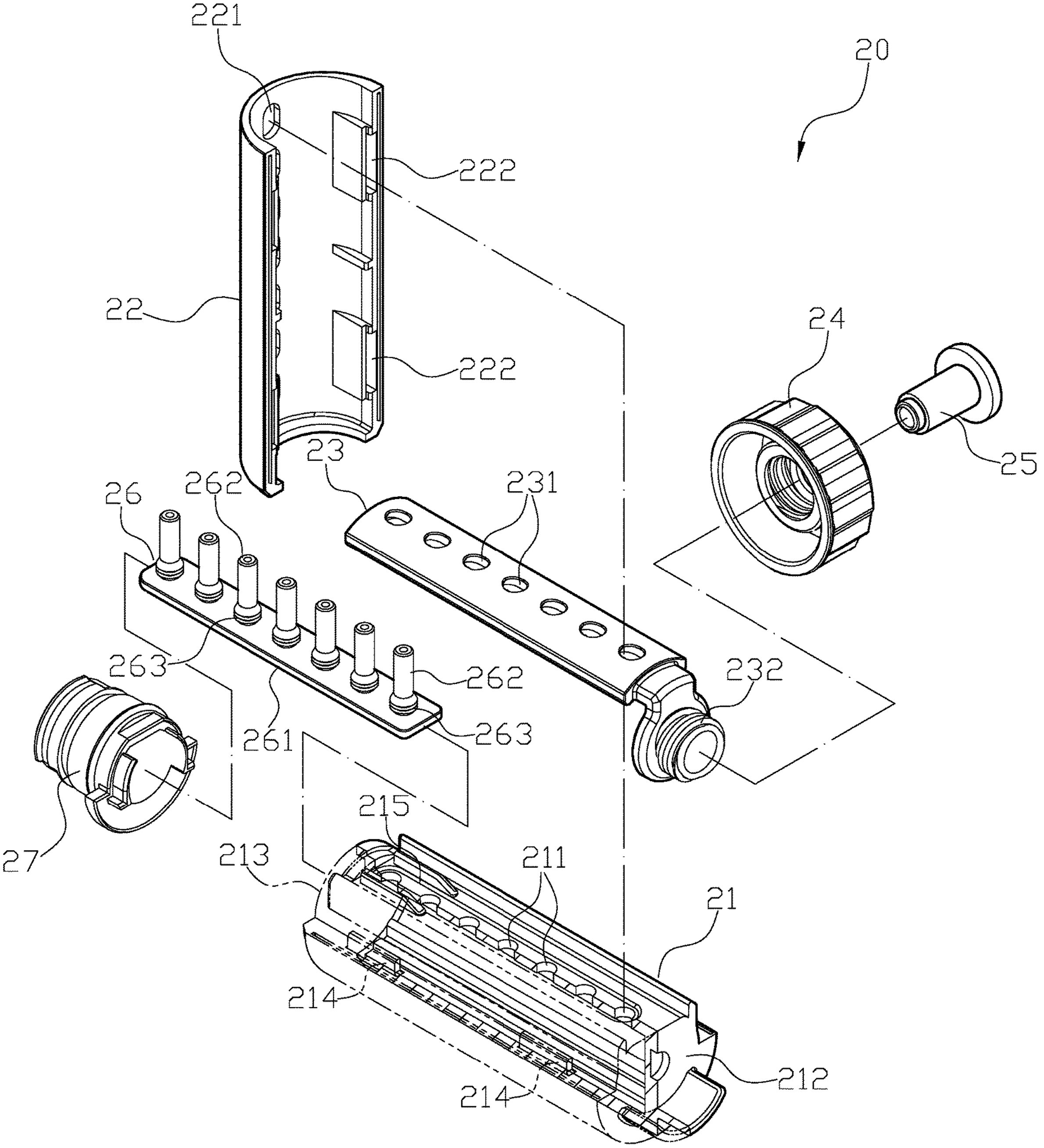
FIG. 3 is a detailed exploded view of the nozzle in the preferred embodiment according to the present invention.
Figure 4:
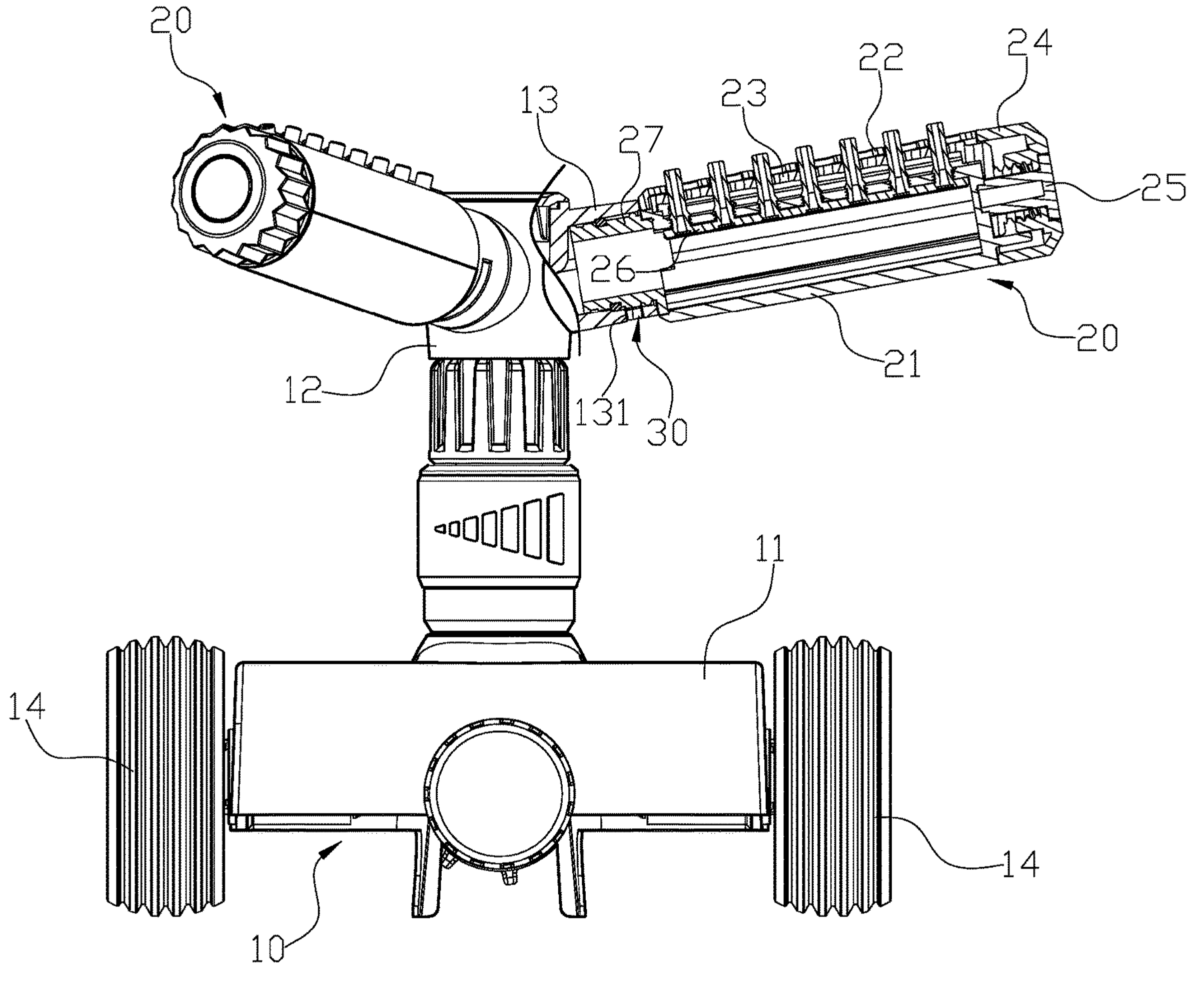
FIG. 4 is a cross-sectional view of the assembly of the preferred embodiment according to the present invention.
Figure 5:
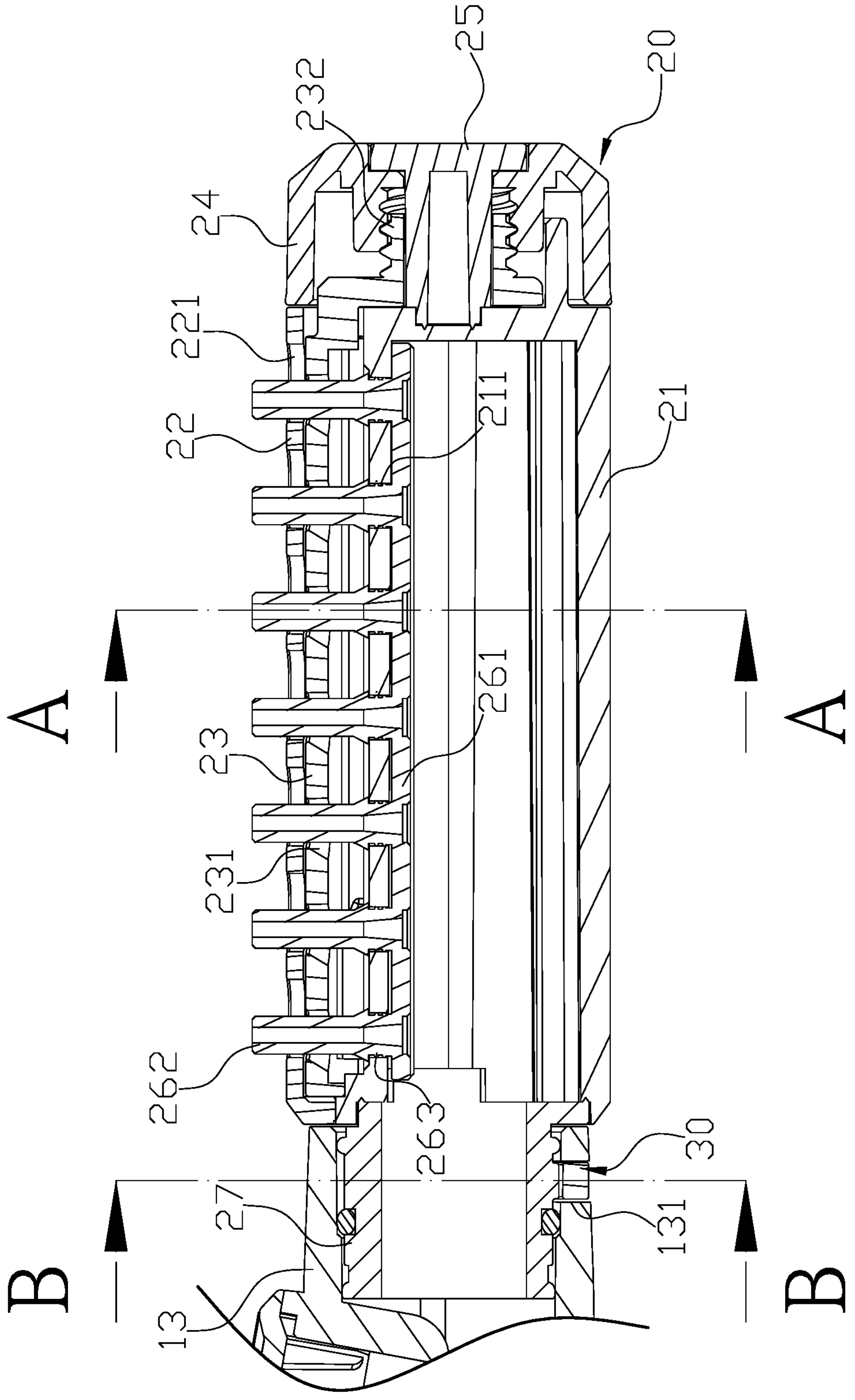
FIG. 5 is a cross-section view of the assembly detail of the preferred embodiment according to the present invention.
Figure 6:
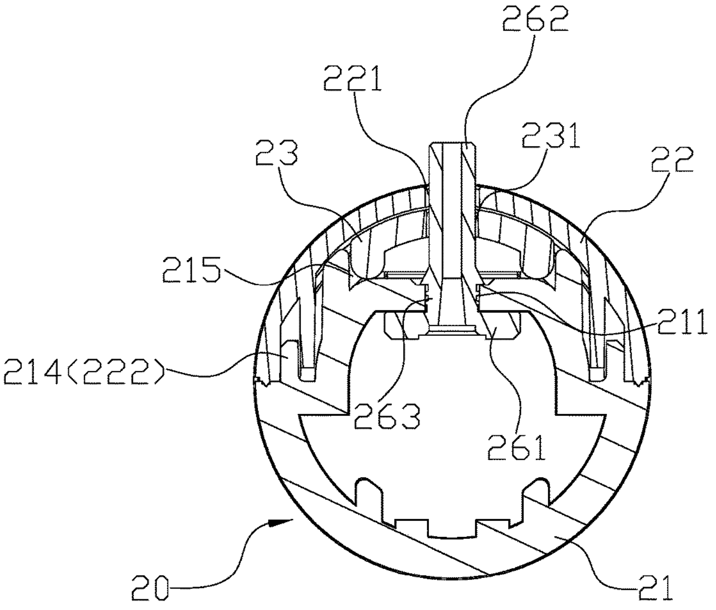
FIG. 6 is a cross-sectional view of the assembly detail from another angle of the preferred embodiment according to the present invention.
Figure 7:
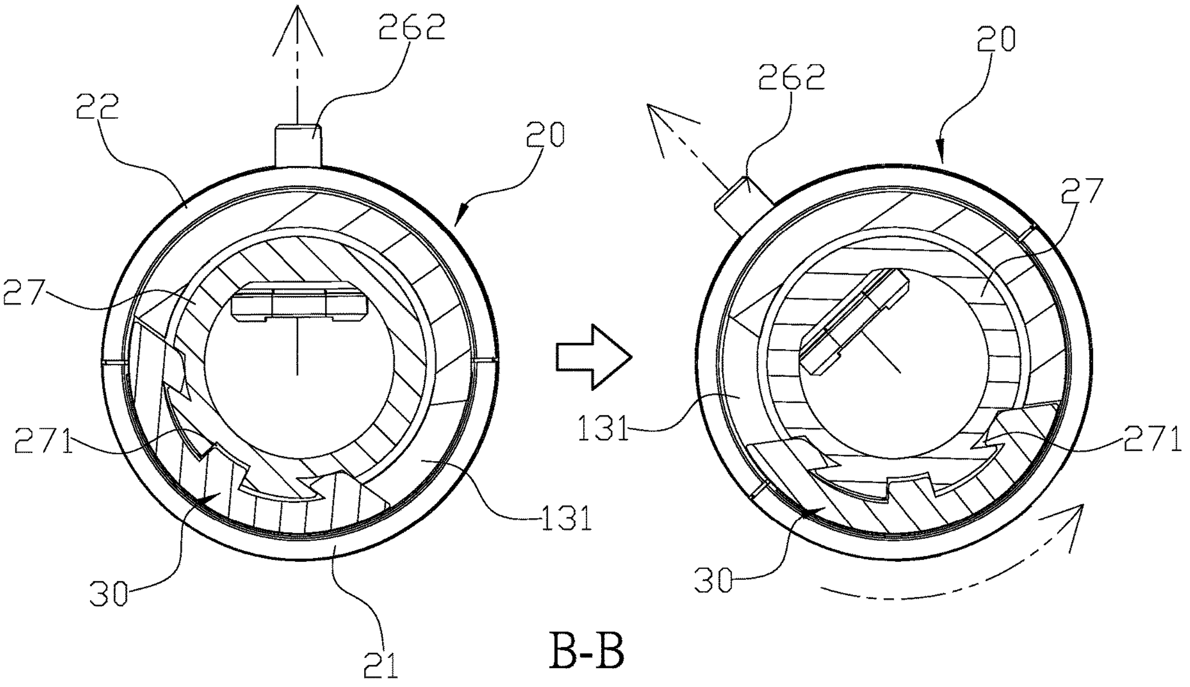
FIG. 7 is a schematic drawing showing the adjustment of the direction of the water outlet in the preferred embodiment according to the present invention.

First, please refer to FIGS. 1-6. An adjustable garden sprinkler comprises: a base member 10 and a plurality of irrigators 20. The base member 10 has a hollow first main body 11 and a second main body 12. The second main body 12 is vertically mounted on a top edge of the first main body 11, and the first main body 11 and the second main body 12 are connected to each other. An input portion 111 at one end of the first main body 11 is configured for connecting to a water source to deliver water into the second main body 12. A top end of the second main body 12 is closed and has a plurality of connecting pipes 13 on an edge, each connecting pipe 13 is connected to the second main body 12 and has a fastening through groove 131. Each irrigator 20 has a first housing 21 and a second housing 22 coupled to each other. A control member 23 is disposed between the first housing 21 and the second housing 22. The first housing 21, the second housing 22 and the control member 23 respectively have a plurality of first through apertures 211, a plurality of second through apertures 221 and a plurality of third through apertures 231, and each second through aperture 221 is an elongated hole. One end of each control member 23 has an outer threaded pipe 232 extending from the first housing 21 and the second housing 22, the outer threaded pipe 232 is threadedly connectable to a screwing cap 24, and the screwing cap 24 is secured through a closed end 212 of the first housing 21 via a positioning nob 25. The positioning nob 25 pivots the screwing cap 24 so that the screwing cap 24 drives the control member 23 to move horizontally during the rotation, to offset the third through apertures 231 from the first through apertures 211. A spraying unit 26 is disposed in the first housing 21, and a hollow joint 27 is connected onto an opening 213 at another end of the first housing 21. Moreover, the spraying unit 26 has a plurality of nozzles 262 connected by a connecting rod 261, and the nozzle 262 are flexibly adjustable. When the spraying unit 26 is mounted in the first housing 21, the nozzles 262 respectively penetrate through the first through apertures 211, the third through apertures 231 and the second through apertures 221. The joint 27 has a plurality of fastening apertures 271, when the joint 27 is inserted in the connecting pipe 13 of the base member 10, a fastening member 30 engages with the fastening apertures 271 of the joint 27 in the fastening through groove 131 to secure the irrigators 20 onto the base member 10. Moreover, the fastening through groove 131 is larger than the fastening member 30, therefore, the irrigator 20 drives the fastening member 30 to rotate in the fastening through groove 131 to adjust the watering angle of the irrigator 20, as shown in FIG. 7.

In addition, the base member 10 further comprises a wheel member 14.

Also, the connecting pipe 13 is tilted up.

Furthermore, the first housing 21 and the second housing 22 respectively have an engaging block 214 and an engaging slot 222 for engaging with the first housing 21 and the second housing 22 correspondingly.

Moreover, the first housing 21 and the second housing 22 are assembled together first and then bonded together by a high frequency process.

Also, the first housing 21 and the second housing 22 are assembled together first and then bonded together by an ultrasound process.

In addition, the first housing 21 has a groove 215 at its top for being sleeved by the control member 23.

Furthermore, a central portion of the control member 23 is raised, which reduce the contact area between the control member 23 and the first housing 21 to make the control member 23 to move smoothly.

Also, the connecting rod 261 of the spraying unit 26 and the nozzles 262 are connected by an elastic member 263.

Additionally, each nozzle 261 of the spraying unit 26 is made of elastic rubber or elastic silicon.

Moreover, the joint 27 is sleeved with at least one sealing ring 40.

Also, wherein the fastening member 30 is a C-shaped hook with multiple hooks.

Figure 8:
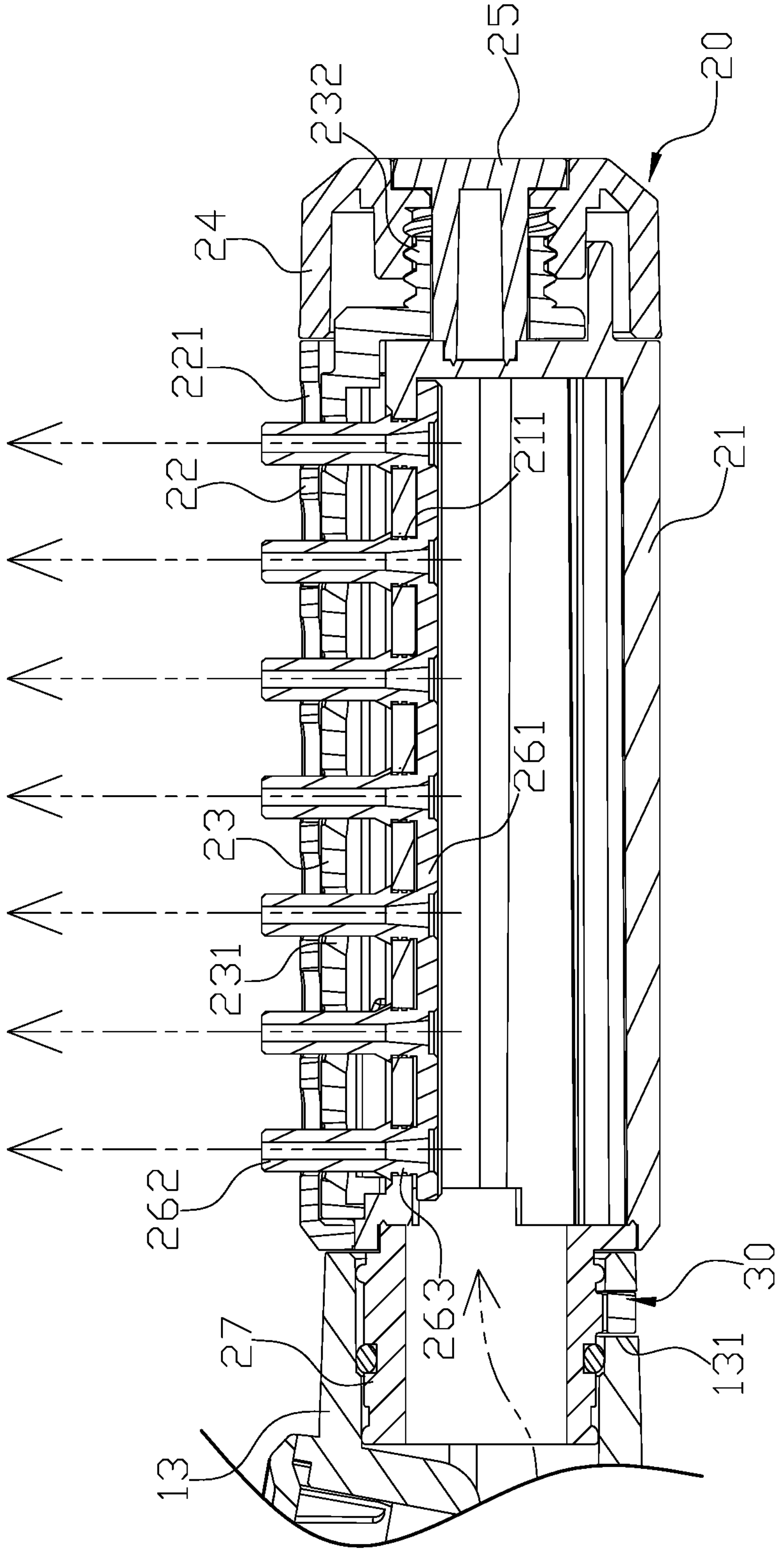
FIG. 8 is a schematic drawing showing the preferred embodiment in use according to the present invention.
Figure 9:
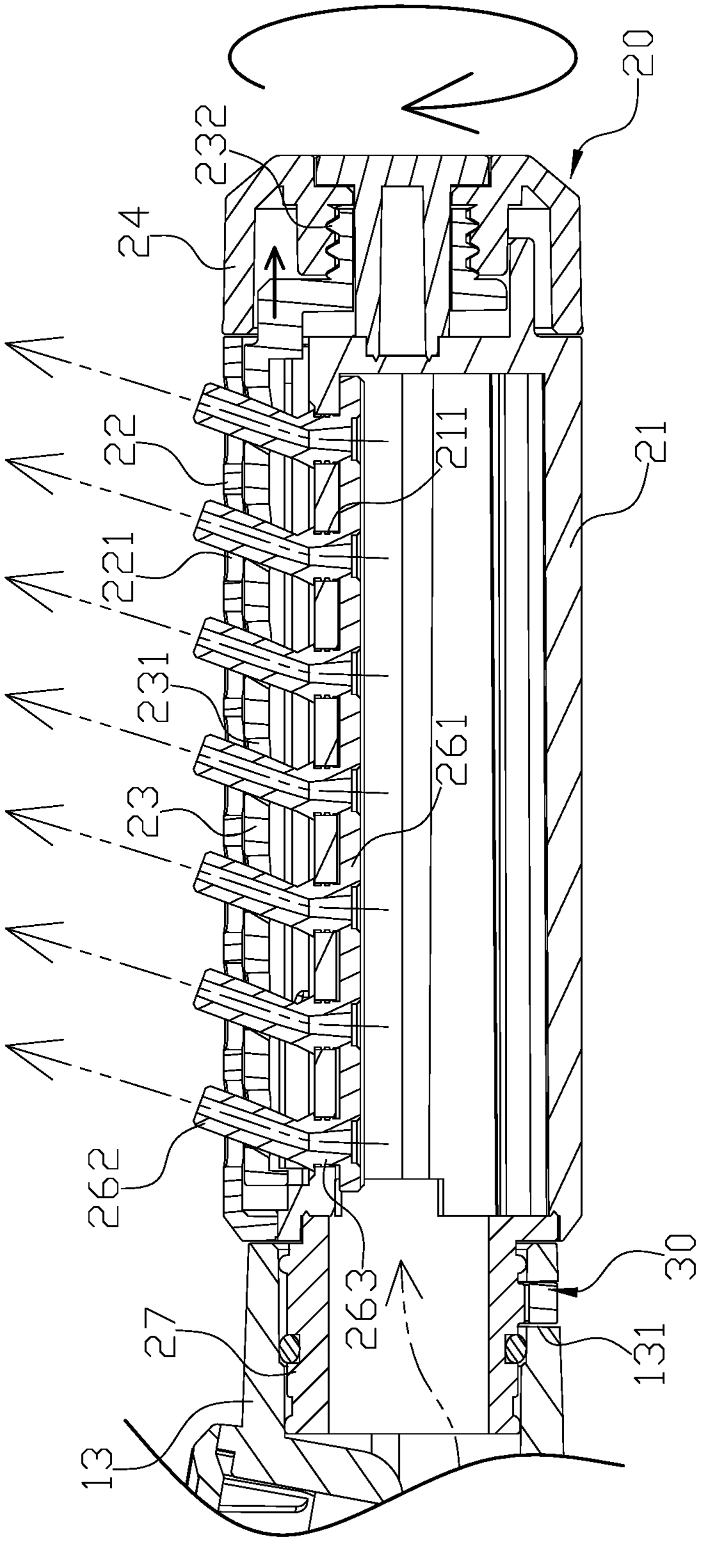
FIG. 9 is a schematic drawing showing the adjustment of the injecting angle of the nozzle in the preferred embodiment according to the present invention.

During the actual use, the water source can be sent into the base member 10 from the input portion 111, then through the rotation of the first main body 11, the second main body 12, the first housing 21, the water is sprayed from each nozzle 262 of the spraying unit 26 of as shown in FIG. 8. The control member 23 is driven to move horizontally through the rotation of the screwing cap 24 while spraying water, so that the third through apertures 231 of the control member 23 are misaligned from the first through apertures 211, and the long second through aperture 221 pushes against the edge of the third through aperture 231 which moves the nozzle 262 to adjust the water spray angle. Please refer to FIG. 9, the adjustment can also be done by different rotation ranges of the screwing cap 24, and the rotation of the irrigator 20 on the connecting pipe 13 allows the garden sprinkler to have both adjustable water outlet angle and water outlet direction, as shown in FIG. 7.

With the structure of the above-mentioned specific embodiment, the following benefits can be obtained: both of the water outlet angle and the water outlet direction of the garden sprinkler can be adjusted, so the spraying range can be enlarged, and the use of the gardening sprinkler can be more comprehensive. Also, the gardening sprinkler can cover a large area and only requires simple installation.

Although the present invention has been explained in relation to its preferred embodiment, it is to be understood that many other possible modifications and variations can be made without departing from the spirit and scope of invention as hereinafter claimed.

What is claimed is:

1. An adjustable garden sprinkler comprising: a base member and a plurality of irrigators; wherein:

the base member has a hollow first main body and a hollow second main body, the second main body vertically mounted on a top edge of the first main body, and the first main body is connected to the second main body; an input portion at one end of the first main body is configured for connecting to a water source to deliver water into the second main body; a top end of the second main body is closed and has a plurality of connecting pipes on an edge, each connecting pipe being connected to the second main body and having a fastening through groove;

each irrigator has a first housing and a second housing coupled to each other, a control member disposed between the first housing and the second housing, each of the first housing, the second housing, and the control member respectively having a plurality of first through apertures, a plurality of second through apertures and a plurality of third through apertures correspondingly aligned with each other and each second through aperture is an elongated hole; one end of each control member has an outer threaded pipe extending from the first housing and the second housing, the outer threaded pipe threadedly connectable to a screwing cap secured though a closed end of the first housing via a positioning nob, such that when the screwing cap is rotating the screwing cap drives the control member to move horizontally to offset the third through apertures from the first through apertures; and a spraying unit is disposed in the first housing, a hollow joint connected onto an opening at another end of the first housing, the spraying unit having a plurality of nozzles connected by a connecting rod and the nozzles are flexibly adjustable; when the spraying unit is mounted in the first housing, the nozzles respectively penetrate through the first through apertures, the third through apertures and the second through apertures; the joint has a plurality of fastening apertures; when the joint is inserted in the connecting pipe of the base member, a fastening member engages with the fastening apertures of the joint in the fastening through groove to secure the irrigators onto the base member.

2. The adjustable garden sprinkler as claimed in claim 1, wherein the base member further comprises a wheel member.

3. The adjustable garden sprinkler as claimed in claim 1, wherein the connecting pipe is tilted up.

4. The adjustable garden sprinkler as claimed in claim 1, wherein the first housing and the second housing respectively have an engaging block and an engaging slot for engaging with the first housing and the second housing correspondingly.

5. The adjustable garden sprinkler as claimed in claim 1, wherein the first housing and the second housing are assembled together first and then bonded together by a high frequency process.

6. The adjustable garden sprinkler as claimed in claim 1, wherein the first housing and the second housing are assembled together first and then bonded together by an ultrasound process.

7. The adjustable garden sprinkler as claimed in claim 1, wherein the first housing has a groove at its top for being sleeved by the control member.

8. The adjustable garden sprinkler as claimed in claim 1, wherein a central portion of the control member is raised.

9. The adjustable garden sprinkler as claimed in claim 1, wherein the connecting rod of the spraying unit and the nozzles are connected by an elastic member.

10. The adjustable garden sprinkler as claimed in claim 1, wherein each nozzle of the spraying unit is made of elastic rubber.

11. The adjustable garden sprinkler as claimed in claim 1, wherein each nozzle of the spraying unit is made of elastic silicon.

12. The adjustable garden sprinkler as claimed in claim 1, wherein the fastening member is a C-shaped hook.

* * * * *